(12) United States Patent
Sohn et al.

(10) Patent No.: US 7,773,165 B2
(45) Date of Patent: Aug. 10, 2010

(54) LIQUID CRYSTAL DISPLAY

(75) Inventors: Ji-won Sohn, Seoul (KR); Mee-hye Jung, Suwon-si (KR); Nak-cho Choi, Seoul (KR); Ho-yun Byun, Hwaseong-si (KR); Seon-ah Cho, Busan Metropolitan (KR); Sik-young Jo, Chungcheongnam-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 642 days.

(21) Appl. No.: 11/566,809

(22) Filed: Dec. 5, 2006

(65) Prior Publication Data

US 2007/0159569 A1 Jul. 12, 2007

(30) Foreign Application Priority Data

Dec. 23, 2005 (KR) .................. 10-2005-0128986

(51) Int. Cl.
G02F 1/136 (2006.01)
G02F 1/1337 (2006.01)

(52) U.S. Cl. .................. 349/43; 349/128; 349/129

(58) Field of Classification Search .............. 349/128, 349/129

See application file for complete search history.

(56) References Cited

U.S. PATENT DOCUMENTS 5,745,207 A 4/1998 Asada et al.
6,573,965 B1* 6/2003 Liu et al. .................. 349/129
6,952,252 B2* 10/2005 Nakanishi .................. 349/182
7,110,063 B2* 9/2006 Takeda et al. .............. 349/85
2006/0209237 A1* 9/2006 Tashiro et al. .............. 349/114
2007/0103607 A1* 5/2007 Hanaoka et al. ............. 349/38
2007/0109238 A1* 5/2007 Lee et al. .................. 345/87

FOREIGN PATENT DOCUMENTS

| CN | 1420383 | 5/2003 |
|----|---------|--------|
| CN | 1573479 | 2/2005 |
| JP | 2003-202594 | 7/2003 |
| KR | 1020010096154 A | 11/2001 |
| KR | 102004099749 A | 12/2004 |

OTHER PUBLICATIONS

English Abstract for Publication No. 1020010096154 A.
English Abstract for Publication No. 2003-202594.
English Abstract Publication No. 1020040099749 A.
Chinese Office Action for Chinese Patent Application 200610166983.1

* cited by examiner

Primary Examiner—Uyen-Chau N Le
Assistant Examiner—Chris H Chu
(74) Attorney, Agent, or Firm—F. Chau & Associates, LLC

(57) ABSTRACT

The liquid crystal display includes a thin film transistor (TFT) panel including a pixel electrode in a rectangular shape having a transverse length longer than a longitudinal length, the pixel electrode including a first domain divider and having upper and lower half portions arranged symmetrically with respect to a transverse long axis passing through a center of the pixel electrode, a common electrode panel including a common electrode facing the pixel electrode, the common electrode including a second domain divider arranged parallel with the first domain divider, and a liquid crystal layer interposed between the TFT panel and the common electrode panel.

22 Claims, 6 Drawing Sheets

FIG. 8

LIQUID CRYSTAL DISPLAY

CROSS-REFERENCE TO RELATED APPLICATION

This application claims priority from Korean Patent Application No. 10-2005-0128986 filed on Dec. 23, 2005, the disclosure of which is incorporated herein by reference in its entirety.

BACKGROUND OF THE INVENTION

1. Technical Field

The present disclosure relates to a liquid crystal display, and more particularly, to a vertically aligned liquid crystal display having a pixel divided into a plurality of domains.

2. Discussion of the Related Art

A liquid crystal display (LCD) is a widely used flat panel display. An LCD can include two substrates comprising field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

A vertical alignment (VA) mode LCD, which aligns LC molecules such that the long axes of the LC molecules are perpendicular to the substrates in the absence of an electric field, has a high contrast ratio and a wide reference viewing angle. The reference viewing angle is defined as a viewing angle making the contrast ratio equal to 1:10 or as a limit angle for the inversion in luminance between the grays.

A wide viewing angle of the VA mode LCD can be realized by, for example, cutouts in the field-generating electrodes and protrusions on the field-generating electrodes. The cutouts and the protrusions can determine the tilt directions of the LC molecules. The tilt directions can be distributed into several directions by using the cutouts and the protrusions such that the reference viewing angle can be widened.

In a conventional LCD, a wide viewing angle can be achieved by arranging LC molecules in units of domains using domain dividing means such as, for example, cutouts and protrusions. However, data lines disposed in the vicinity of a pixel electrode and extending in a longitudinal direction may not coincide with the tilt directions of the LC molecules, which may cause textures to the data lines, resulting in light leakage.

SUMMARY OF THE INVENTION

Exemplary embodiments of the present invention provide a liquid crystal display which can prevent instantaneous residual images and textures and can achieve a high aperture ratio and an enhanced wide viewing angle.

Exemplary embodiments of the present invention provide a method of manufacturing the liquid crystal display panel.

According to an embodiment of the present invention, a liquid crystal display includes a TFT panel including a thin film transistor (TFT) panel including a pixel electrode in a rectangular shape having a transverse length longer than a longitudinal length, the pixel electrode including a first domain divider and having upper and lower half portions arranged symmetrically with respect to a transverse long axis passing through a center of the pixel electrode, a common electrode panel including a common electrode facing the pixel electrode, the common electrode including a second domain divider arranged parallel with the first domain divider, and a liquid crystal layer interposed between the TFT panel and the common electrode panel.

According to an embodiment of the present invention, a liquid crystal display including an insulating substrate, a plurality of gate lines formed on the insulating substrate, a plurality of data lines crossing the plurality of gate lines, a plurality of pixel electrodes formed on the insulating substrate in a matrix and each pixel electrode having a first side parallel to the plurality of gate lines and a second side shorter than the first side, the second side being adjacent to the first side, a common electrode facing the plurality of pixel electrodes, and a liquid crystal layer interposed between the plurality of pixel electrodes and the common electrode panel and having liquid crystal molecules, wherein the liquid crystal layer includes a first domain group and a second domain group, the first domain group including the liquid crystal molecules aligned at an angle of approximately 135 degrees or approximately −45 degrees with respect to the gate lines and the second domain group including the liquid crystal molecules aligned at an angle of approximately −135 degrees or approximately 45 degrees with respect to the gate lines.

BRIEF DESCRIPTION OF THE DRAWINGS

Exemplary embodiments of the present invention can be understood in more detail from the following description taken in conjunction with the accompanying drawings in which.

DETAILED DESCRIPTION OF EXEMPLARY EMBODIMENTS

Exemplary embodiments of the present invention are more fully described below with reference to the accompanying drawings. The present invention may, however, be embodied in many different forms and should not be construed as being limited to the embodiments set forth herein.

In an embodiment of the present invention, a liquid crystal display includes a thin film transistor (TFT) panel having a TFT defined by a gate line and a data line, a common electrode panel, which is separated from and faces the TFT panel, including a common electrode, and a liquid crystal layer interposed between the TFT panel and the common electrode panel. Long axes of the LC molecules in the liquid crystal layer are disposed substantially perpendicular to the panels.

Figure 1A:
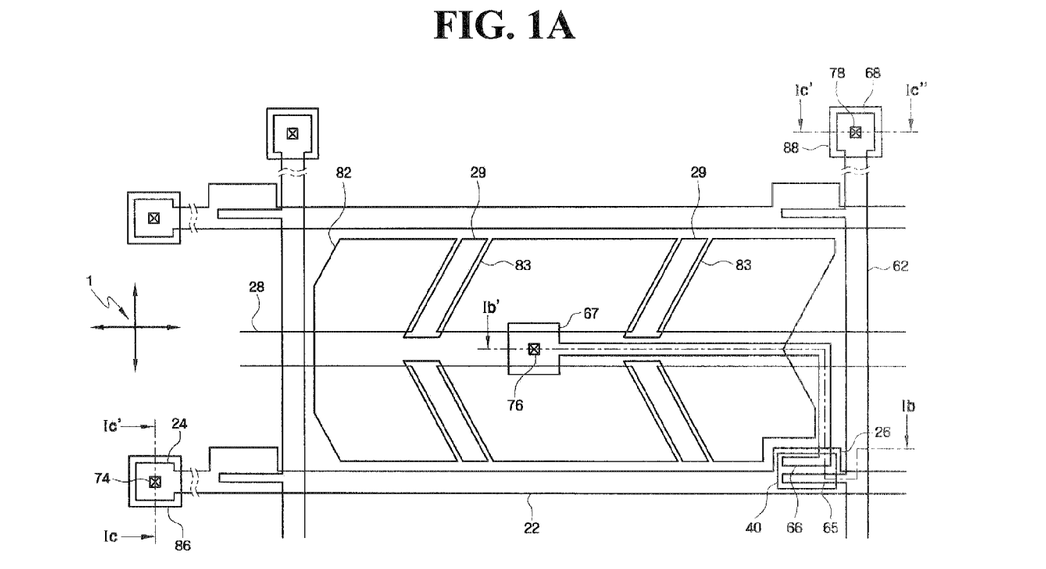
FIG. 1A is a layout view of a thin film transistor (TFT) panel of a liquid crystal display (LCD) according to an embodiment of the present invention.
Figure 1B:
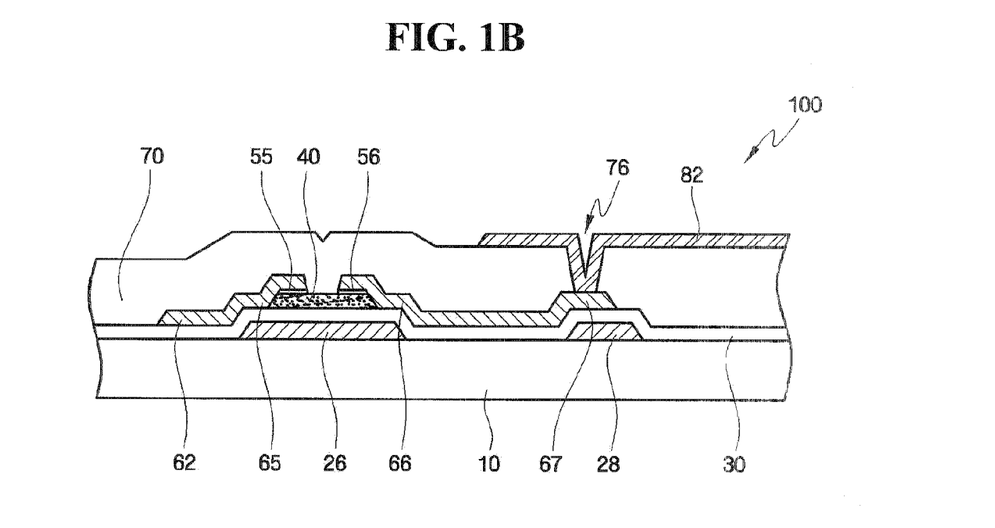
FIG. 1B is a cross-sectional view of the TFT panel taken along the line Ib-Ib' of FIG. 1A.
Figure 1C:
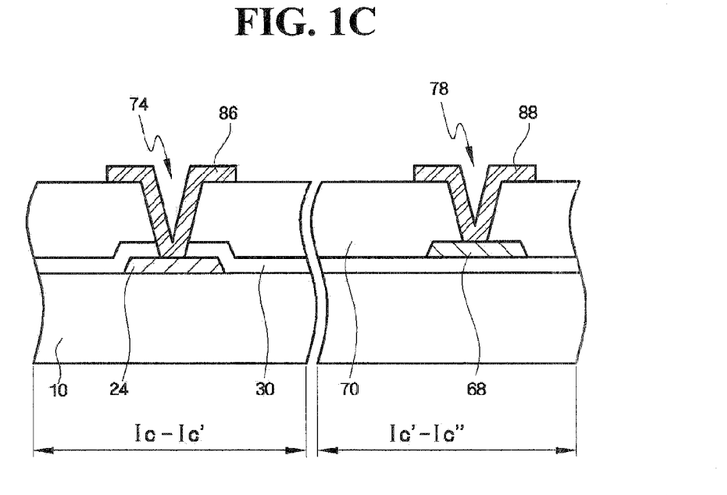
FIG. 1C is a cross-sectional view of the TFT panel taken along the lines Ic-Ic' and Ic'-Ic" of FIG. 1A.

A thin film transistor (TFT) panel 100 is described with reference to FIGS. 1A through 1C. FIG. 1A is a layout view of a thin film transistor (TFT) panel of a liquid crystal display (LCD) according to an embodiment of the present invention. FIG. 1B is a cross-sectional view of the TFT panel taken along the line Ib-Ib' of FIG. 1A. FIG. 1C is a cross-sectional view of the TFT panel taken along the lines Ic-Ic' and Ic-Ic" of FIG. 1A.

A gate line 22 is formed on an insulating substrate 10 in a transverse direction, and a gate electrode 26 is connected to the gate line 22 in the form of a protrusion. A gate line terminal 24 for applying a gate signal from another layer or an external circuit and for transmitting the received gate signal to the gate line 22 is formed at an end of the gate line 22. The width of the gate line terminal 24 is large enough for connecting an external circuit. The gate line 22, the gate line terminal 24, and the gate electrode 26 constitute a gate wire (22, 24, 26).

A storage electrode line 28 extending substantially in a transverse direction across a pixel area is formed on the insulating substrate 10. A storage electrode 29 branched from the storage electrode line 28 is formed along a domain divider 83 for dividing a pixel electrode 82 into a plurality of domains. The storage electrode line 28 and the storage electrode 29 constitute a storage electrode wire (28, 29). In an embodiment of the present invention, to increase an aperture ratio of the LCD, the storage electrode line 28 extends in a transverse direction across a center of the pixel electrode 82 to be substantially in parallel to the gate line 22, and the storage electrode 29 is formed to overlap the domain divider 83. In embodiments of the present invention, the shape and arrangement of the storage electrode 29 and the storage electrode line 28 may vary as long as a predetermined storage capacitance can be established with respect to the pixel electrode 82.

The gate wire (22, 24, 26) and the storage electrode wire (28, 29) may comprise, for example, Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate wire (22, 24, 26) and the storage electrode wire (28, 29) may have a multi-layered structure including two conductive films (not shown) having different physical characteristics. One of the two films can be a low resistivity metal including, for example, Al containing metal, Ag containing metal, and Cu containing metal for reducing signal delay or voltage drop in the gate wire (22, 24, 26) and the storage electrode wire (28, 29). The other film can comprise a material such as, for example, a Mo containing metal, Cr, Ta or Ti, which have good physical, chemical, and electrical contact characteristics with other materials such as, for example, indium tin oxide (ITO) or indium zinc oxide (IZO). Examples of combinations of the two films are a lower Cr film and an upper Al (or Al alloy) film and a lower Al (or Al alloy) film and an upper Mo (or Mo alloy) film. The gate wire (22, 24, 26) may comprise various metals or conductors.

A gate insulating layer 30 is formed on the gate wire (22, 24, 26) and the storage electrode wire (28, 29).

A semiconductor layer 40 comprising, for example, hydrogenated amorphous silicon or polycrystalline silicon, is formed on the gate insulating layer 30. The semiconductor layer 40 may be formed in various shapes such as, for example, an island shape or a stripe shape. In an embodiment of the present invention, the semiconductor layer 40 may be formed in an island shape extending over the gate electrode 26 under the data line 62. When the semiconductor layer 40 is formed in a stripe shape, the semiconductor layer 40 may be disposed under the data line 62 and extend up to the gate electrode 26.

Ohmic contact layers 55 and 56 comprising, for example, silicide or n+ amorphous silicon hydride in which an n-type impurity is highly doped, are formed on the semiconductor layer 40. The ohmic contact layers 55 and 56 may have a variety of shapes, including, for example, an island shape and a stripe shape. For example, when the ohmic contact layers 55 and 56 are formed in an island shape, the ohmic contact layers 55 and 56 are positioned below a source electrode 65 and a drain electrode 66. When the ohmic contact layers 55 and 56 are formed in a stripe shape, the ohmic contact layers 55 and 56 may extend below a data line 62.

The data line 62 and the drain electrode 66 are formed on the ohmic contact layers 55 and 56 and the gate insulating layer 30. The data line 62 extends lengthwise and intersects the gate line 22 to define a pixel. A transverse length of each pixel defined by the data line 62 and the gate line 22 is longer than a longitudinal length. In other words, the pixel has a substantially rectangular shape, and a distance between two neighboring gate lines 22 is smaller than a distance between two neighboring data lines 62. The source electrode 65 protrudes from the data line 62 in the form of a branch and extends over the semiconductor layer 40. A data line terminal 68 for applying a data signal from another layer or an external circuit and for transmitting the received gate signal to the data line 62 is formed at an end of the data line 62. The width of the data line terminal 68 is large enough for connecting to an external circuit. The drain electrode 66 is separated from the source electrode 65 and is positioned on the semiconductor layer 40. The drain electrode 66 is formed opposite to the source electrode 65 with respect to the gate electrode 26.

The drain electrode 66 comprises a stripe pattern on the semiconductor layer 40 and a drain electrode pad 67 extending from the stripe pattern having a large enough area. A contact hole 76 is positioned in the drain electrode pad 67. In an embodiment of the present invention, the drain electrode pad 67 can be positioned at the center of a pixel area. The drain electrode pad 67 electrically connected with the pixel electrode 82 through the contact hole 76 may partially overlap the storage electrode wire (28, 29). A shape and arrangement of the drain electrode pad 67 may vary as long as predetermined storage capacitance can be established with respect to the pixel electrode 82. The data line 62, the data line terminal 68, the source electrode 65, the drain electrode 66, and the drain electrode pad 67 constitute a data wire (62, 65, 66, 67, 68).

The data wire (62, 65, 66, 67, 68) may comprise, for example, chromium (Cr), a molybdenum (Mo) containing metal, a refractory metal such as, for example, tantalum (Ta) or titanium (Ti). The data wire (62, 65, 66, 67, 68) may be formed as a single layer or multiple layers including a lower film (not shown) comprising a refractory metal film and a low-resistivity upper film (not shown). Examples of the multiple layers include a double-layered structure having a lower Cr film and an upper Al (or Al alloy) film, a double-layered structure having a lower Al (or Al alloy) film and an upper Mo (or Mo alloy) film, and a triple-layered structure having a lower Mo film, an intermediate Al film, and an upper Mo film.

At least a portion of the source electrode 65 overlaps the semiconductor layer 40, and at least a portion of the drain electrode 66 facing the source electrode 65 overlaps the semiconductor layer 40. The ohmic contact layers 55 and 56 are interposed between the underlying semiconductor layer 40 and each of the overlying source electrode 65 and drain electrode 66 to reduce the contact resistance therebetween.

A passivation layer 70 comprising an insulating layer is formed on the data line 63, the drain electrode 66 and the exposed semiconductor layer 40. The passivation layer 70 may comprise, for example, an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). Alternatively, to protect the exposed semiconductor layer 40 and maintain an organic property thereof, the passivation layer 70 may be formed as a double-layered structure having a lower inorganic layer and an upper organic layer.

Contact holes 76 and 78 are formed in the passivation layer 70 to expose the drain electrode pad 67 and the data line terminal 68, respectively. The contact hole 74 exposing the gate line terminal 24 is formed in the passivation layer 70 and the gate insulating layer 30.

The pixel electrode 82 is formed on the passivation layer 70 according to a pixel shape. The pixel electrode 82 can have a substantially rectangular shape having a transverse length longer than a longitudinal length. The pixel electrode 82 can be partitioned by the domain divider 83 forming an angle of approximately 45 degrees or approximately −45 degrees with respect to a transmissive axis 1 of a polarizer. The domain divider 83 includes upper half portions and lower half portions with respect to the transverse long axis passing through a center of the pixel electrode 82. The upper half portions are parallel with each other, and the lower half portions are parallel with each other. The upper half portions and the lower half portions form an angle with respect to the gate lines 22. For example, the upper half portions form an angle of approximately −45 degrees with respect to the gate lines 22 and lower half portions form an angle of approximately 45 degrees with respect to the gate lines 22. Each of the upper and lower half portions are arranged separately from each other with respect to the transverse long axis. In an embodiment of the present invention, the domain divider 83 can be, for example, a plurality of cutouts provided in a diagonal direction. In an alternative embodiment of the present invention, protrusions may be formed on the pixel electrode 82.

An auxiliary gate line terminal 86 and an auxiliary data line terminal 88 connected to the gate line terminal 24 and the data line terminal 68 via the contact holes 74 and 78, respectively, are also formed on the passivation layer 70. The pixel electrode 82, the auxiliary gate line terminal 86 and the auxiliary data line terminal 88 comprise, for example, a transparent conductor such as ITO or IZO or a reflective conductor such as Al. The auxiliary gate line terminal 86 and the auxiliary data line terminal 88 are complement adhesions to external circuit devices.

The pixel electrode 82 is physically and electrically connected to the drain electrode 66 via the contact hole 76 and receives a data voltage from the drain electrode 66.

An alignment film (not shown) for alignment of LC molecules may be formed on the pixel electrode 82, the auxiliary gate line terminal 86 and the auxiliary data line terminal 88 and the passivation layer 70.

Figure 2:
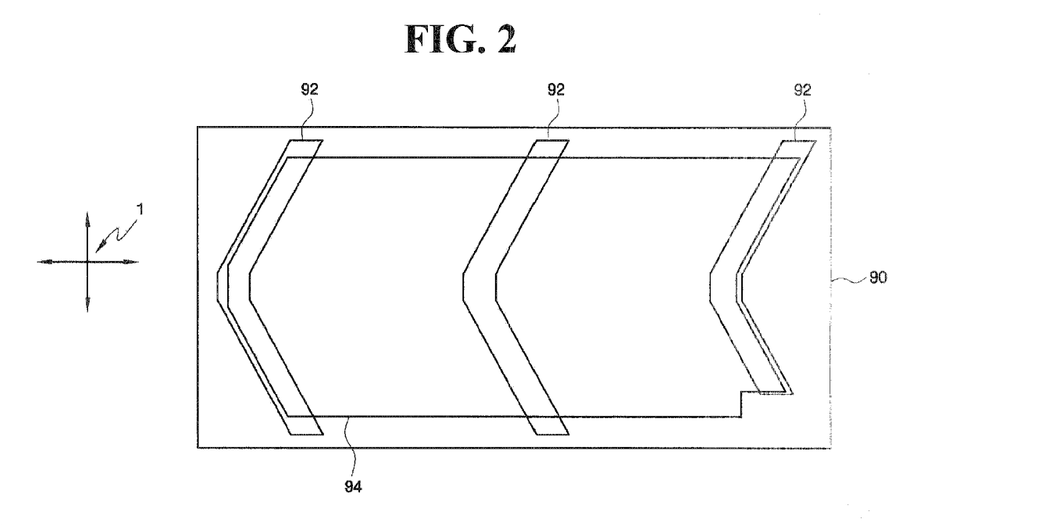
FIG. 2 is a layout view of a common electrode panel of the LCD according to an embodiment of the present invention.
Figure 3A:
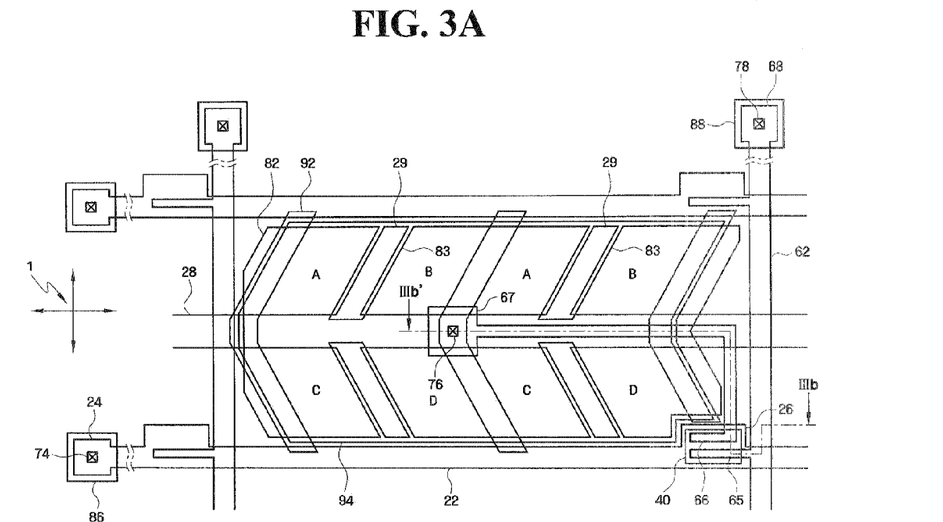
FIG. 3A is a layout view of the LCD according to an embodiment of the present invention including the TFT panel shown in FIG. 1A and the common electrode panel shown in FIG. 2.
Figure 3B:
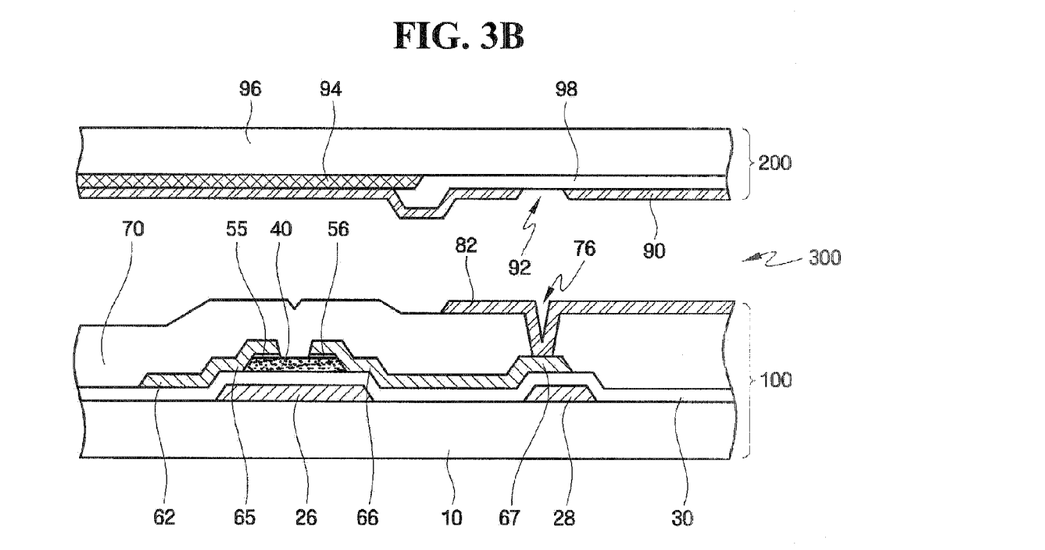
FIG. 3B is a cross-sectional view of the LCD taken along the line IIIb-IIIb' of FIG. 3A.
Figure 3C:
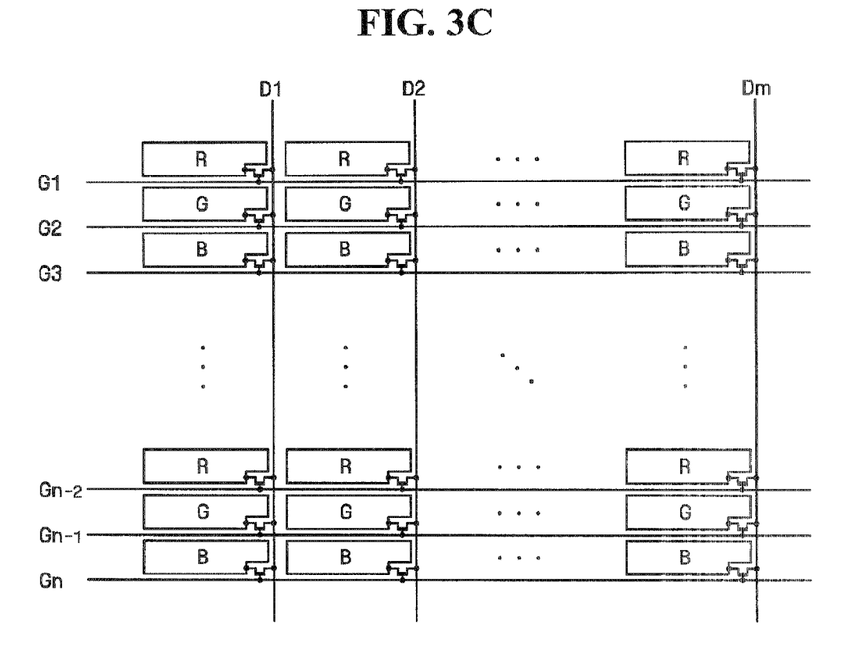
FIG. 3C is a schematic diagram of a pixel array of the LCD shown in FIG. 3A.

A common electrode panel 200 of an LCD according to an embodiment of the present invention and an LCD including the common electrode panel 200 is described with reference to FIGS. 2 through 3C. FIG. 2 is a layout view of a common electrode panel of an LCD according to an embodiment of the present invention. FIG. 3A is a layout view of an LCD according to an embodiment of the present invention including the TFT panel shown in FIG. 1A and the common electrode panel shown in FIG. 2. FIG. 3B is a cross-sectional view of the LCD taken along the line IIIb-IIIb' of FIG. 3A. FIG. 3C is a schematic diagram of a pixel array of the LCD shown in FIG. 3A.

Referring to FIGS. 2 through 3B, a black matrix 94 for preventing light leakage is formed on an insulating substrate 96 comprising a transparent insulating material, such as, for example, glass. The black matrix 94 may be formed by depositing an opaque material on a base panel substrate and etching the same. The black matrix 94 improves an image quality by preventing light leakage. Red, green, and blue color filters 98 are sequentially arranged to form a unit pixel. The red, green, and blue color filters 98 are primarily arranged on an area of a pixel area where the black matrix 94 is not formed, and selectively transmit light in a predetermined range of wavelengths. As shown in FIG. 3C, since the LCD according to an embodiment of the present invention has a pixel longer in a transverse direction than in a longitudinal direction, the red, green, and blue color filters 98 can be repeatedly arranged in sequence along data lines D1, D2, . . . , Dm. To reduce flickering, the LCD may be driven by, for example, a "1 dot inversion" method, a "2 dot inversion" method, or a "(1+2) dot inversion" method.

A common electrode 90 comprising a transparent conductive material such as, for example, ITO or IZO and having a domain divider 92, is formed on the color filters 98.

The common electrode 90, which faces the pixel electrode 82, has the domain divider 92 forming an angle of approximately 45 degrees or approximately −45 degrees with respect to the transmissive axis 1 of a polarizer. The domain divider 92 has upper and lower portions with respect to the transverse long axis passing through the center of the pixel electrode 82. The upper portions are parallel with each other, and the lower portions are parallel with each other. The pixel electrode 82 is longer in a transverse direction than in a longitudinal direction. In an embodiment of the present invention, the domain divider 92 can be a plurality of cutouts provided in a diagonal direction. In an alternative embodiment of the present invention, protrusions formed on the common electrode 90 may be provided as the domain divider 92.

As shown in FIG. 3A, the domain divider 83 and the domain divider 92 divide a pixel region into a plurality of domains. The domain dividers 83 and 92 can be cutouts or protrusions. Domains of the pixel electrode 82 are divided in a longitudinal direction with respect to the transverse long axis passing through the center of the pixel electrode 82. The transverse length of the pixel electrode 82 is longer than the longitudinal length of the pixel electrode 82. The storage electrode line 28 may be formed along the transverse long axis. The domain dividers 83 and 92 are formed in a diagonal direction between the transverse long axis and gate line 22. The domains of the pixel electrode 82 are divided into transverse direction. In an embodiment of the present invention, the domain divider 83 of the pixel electrode 82 and the domain divider 92 of the common electrode 90 may be alternately arranged in a transverse direction along the gate lines 22. In an embodiment, a domain divider 92 of the common electrode 90 is formed in a center of the pixel electrode 82, the domain divider 83 of the pixel electrode 82 is formed at both sides of the domain divider 92 of the common electrode 90, and another domain divider 92 of the common electrode 90 is formed at either side of the domain divider 83 of the pixel electrode 82.

In an embodiment of the present invention, the pixel electrode 82 includes 8 domains divided by the storage electrode line 28 and the domain dividers 83 and 92. In an alternative embodiment of the present invention, the domains can be more or less than eight (8).

An overcoat layer (not shown), which is an insulating layer comprising an organic material, may be interposed between the common electrode 90 and the color filters 98. The overcoat planarizes the common electrode panel 200. In an alternative embodiment, the overcoat layer can be omitted. An alignment film (not shown) for aligning liquid crystal molecules may be coated on the common electrode 90.

Referring to FIG. 3A, the drain electrode pad 67 is disposed in the center of the pixel electrode 82 to overlap the domain divider 92 of the common electrode 90 to increase an aperture ratio. The drain electrode pad 67 may have various shapes and arrangements.

Referring to FIG. 3B, the TFT panel 100 and the common electrode panel 200 facing the TFT panel 100 are aligned and connected to each other, and the liquid crystal layer 300 including liquid crystal molecules is interposed therebetween.

The liquid crystal molecules in the liquid crystal layer 300 are aligned such that long axes of the molecules are substantially perpendicular to the TFT panel 100 and the common electrode panel 200 when there is no electric field applied between the TFT panel 100 and the common electrode panel 200. In an embodiment, the liquid crystal layer 300 has negative dielectric anisotropy. The TFT panel 100 and the common electrode panel 200 are aligned such that the pixel electrode 82 completely overlaps the corresponding color filter 98. A pixel area can be divided into multiple domains by the domain divider 83 of the pixel electrode 82 and the domain divider 92 of the common electrode 90. The pixel area can be divided into multiple domains according to tilt directions upon application of a primary electric field generated by the liquid crystal molecules included in the liquid crystal layer 300.

An LCD according to an embodiment of the present invention may further include a polarizing panel, a backlight, and a compensation panel.

A polarizing panel including a pair of polarizers, may be attached to external surfaces of the LCD such that the transmissive axis 1 of each polarizer is crossed. The pair of polarizers may be positioned so that the transmissive axis 1 of the polarizer can be substantially parallel with the gate lines 22.

Referring to FIG. 3A, the application of an electric field to the liquid crystal layer 300 provides tilted liquid crystal molecules in the respective domains in a direction substantially perpendicular to the domain dividers 83 and 92. Thus, the liquid crystal molecules in the respective domains form an angle of approximately 45 degrees or approximately −45 degrees with respect to the transmissive axis 1 of the polarizer. A lateral electric field produced between the domain dividers 83 and 92 facilitates alignment of the liquid crystal molecules included in the respective domains.

The multiple domains divided by the domain dividers 83 and 92 according to the tilt directions of the liquid crystal molecules are described with reference to FIG. 3A. The pixel electrode 82 is divided into first and second domain groups in a longitudinal direction with respect to the transverse long axis passing through the center of the pixel electrode 82. The first domain group includes a plurality of domains A aligned at an angle of approximately 135 degrees and a plurality of domains B aligned at an angle of approximately −45 degrees with respect to the gate lines 22. The second domain group includes a plurality of domains C aligned at an angle of approximately −135 degrees and a plurality of domains D aligned at an angle of approximately 45 degrees with respect to the gate lines 22. As shown in FIG. 3A, the first domain group can be arranged such that each of the plurality of domains A and each of the plurality of domains B are alternately arranged. The domains select alternately from the domains A and B, for example, in an A-B-A-B order, may be arranged. The second domain group can be arranged such that each of the plurality of domains C and each of the plurality of domains D are alternately arranged. The domains selected alternately from the domains C and D, for example, in a C-D-C-D order, may be arranged.

An LCD according to an embodiment of the present invention prevents textures and light leakage.

The pixel electrode 82 can be a substantially rectangular shape having a transverse length longer than a longitudinal length. The storage electrode line 28 crosses the center of the pixel electrode 82 so that the storage electrode line 28 extends substantially parallel with the gate lines 22. The domain divider 83 provided in the pixel electrode 82 forms an angle of approximately 45 degrees or −45 degrees with respect to the transmissive axis 1 of the polarizer. In the common electrode 90 facing the pixel electrode 82, the domain divider 92 forms an angle of approximately 45 degrees or approximately −45 degrees with respect to the transmissive axis 1 of the polarizer. In such a method, a pixel can be partitioned into multiple domains using the pixel electrode 82 and the domain dividers 83 and 92.

When an electric field is applied to liquid crystal molecules due to a voltage difference between the pixel electrode 82 and the common electrode 90, the liquid crystal molecules in the respective domains are tilted in a direction perpendicular to the domain dividers 83 and 92. Accordingly, the liquid crystal molecules in the respective domains are tilted at an angle of approximately 45 degrees or approximately −45 degrees with respect to the transmissive axis 1 of the polarizer.

An LCD according to an embodiment can achieve a wide viewing angle by driving a pixel divided into multiple domains and can increase a high aperture ratio by reducing an occupied area using the domain dividers 83 and 92. An instantaneous residual image can be suppressed by adjusting a distance between the domain divider 83 formed on the pixel electrode 82 and the domain divider 92 formed on the common electrode 90.

In an LCD, textures may cause light leakage. Textures may occur in the vicinity of the data lines 62 extending in the longitudinal direction because a relatively high data voltage is transmitted through the data lines 62. The high data voltage produces a lateral electric field in the vicinity of the data lines 62. Thus, when an electric field is applied to liquid crystal molecules in the vicinity of the data lines 62, the liquid crystal molecules are affected by both the lateral electric field produced from the data lines 62 and a lateral electric field produced from the domain dividers 83 and 92 extending in diagonal directions. Tilt directions of the liquid crystal molecules in a single domain are different from one another, resulting in textures and light leakage. In an LCD according to an embodiment of the present invention, since the transverse length of the pixel electrode 82 is longer than the longitudinal length thereof, occurrence of textures due to the lateral electric field produced from the data lines 62 can be suppressed by reducing an area of the pixel electrode 82 adjacent to the data lines 62.

In an LCD according to an embodiment of the present invention, when using the passivation layer 70 comprising an inorganic material, a storage electrode 29 in the form of a branch of a storage electrode line 28 may overlap the domain divider 83, thereby reducing a width of the domain divider 83 formed on the pixel electrode 82 to approximately 6 μm or less. In other words, since the passivation layer 70 comprising an inorganic material has a relatively small thickness, a lateral electric field effect produced from the storage electrode 29 can be strengthened. Therefore, even if the width of the domain divider 83 is reduced to approximately 6 μm or less, a sufficient lateral electric field can be achieved by forming the storage electrode 29 below the domain divider 83.

Figure 4:
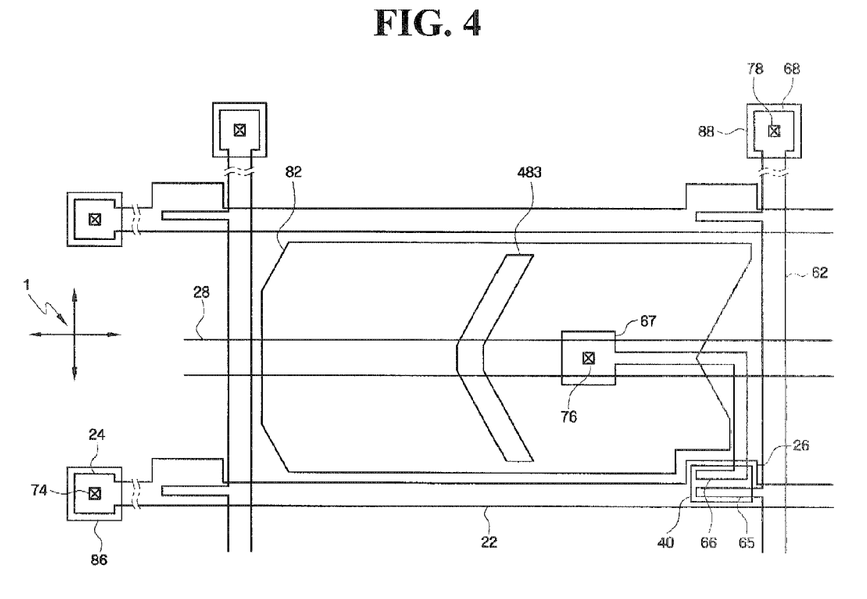
FIG. 4 is a layout view of a TFT panel of an LCD according to an embodiment of the present invention.
Figure 5:
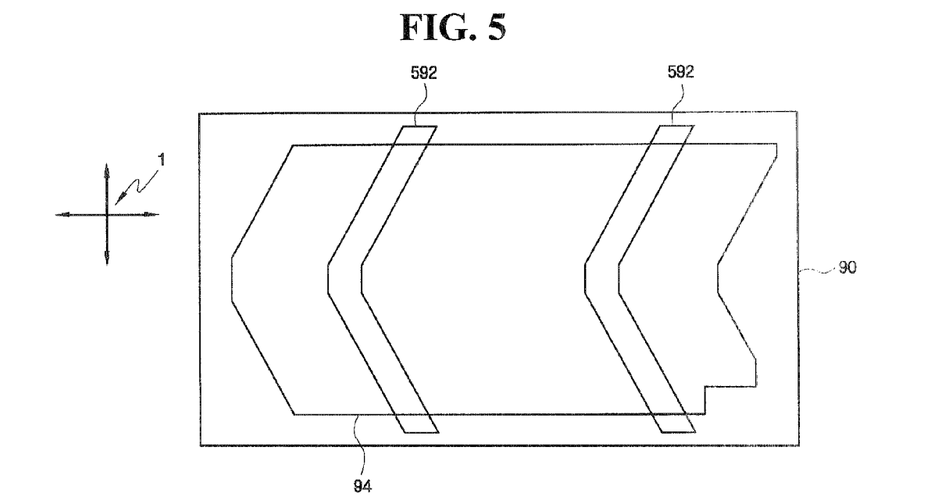
FIG. 5 is a layout view of a common electrode panel of the LCD according to an embodiment of the present invention.
Figure 6:
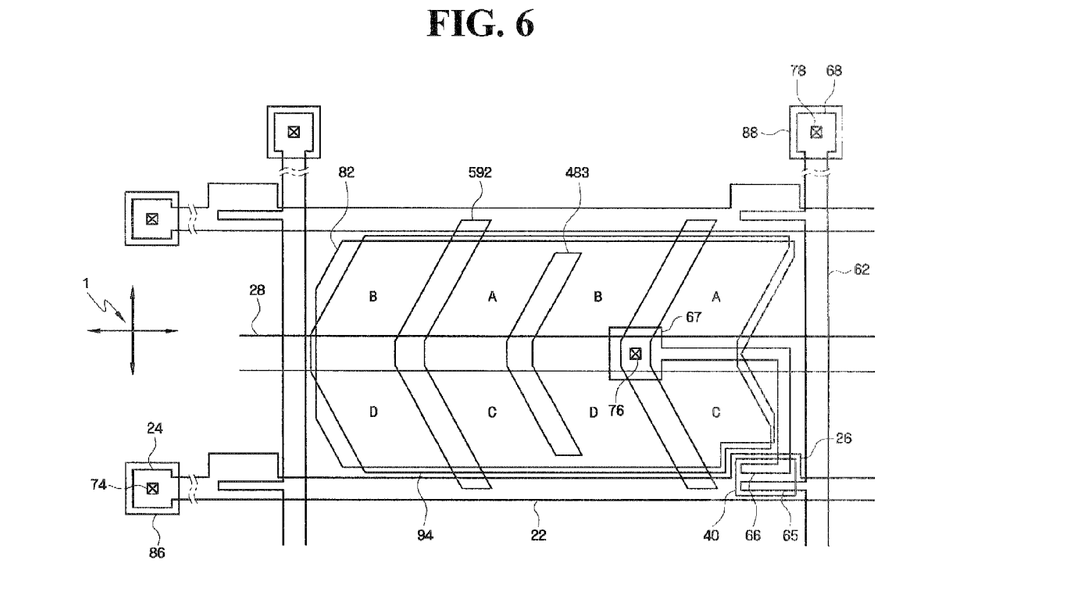
FIG. 6 is a layout view of the LCD according to an embodiment of the present invention including the TFT panel shown in FIG. 4 and the common electrode panel shown in FIG. 5.

A liquid crystal display according to an embodiment of the present invention is described with reference to FIGS. 4 through 6. FIG. 4 is a layout view of a TFT panel of an LCD according to an embodiment of the present invention. FIG. 5 is a layout view of a common electrode panel of the LCD according to an embodiment of the present invention. FIG. 6 is a layout view of the LCD according to an embodiment of the present invention including the TFT panel shown in FIG. 4 and the common electrode panel shown in FIG. 5. The liquid crystal display panel in accordance with an embodiment has a substantially similar configuration as the liquid crystal display panel according to the embodiment described in connection with FIG. 1 through FIG. 3C except for the following.

Referring to FIGS. 4 through 6, the pixel electrode 82 is divided into multiple domains by a domain divider 483 forming an angle of approximately 45 degrees or approximately −45 degrees with respect to a transmissive axis 1 of a polarizer. The domain divider 483 of the pixel electrode 82 is formed in a center of the pixel electrode 82. The common electrode 90 is divided into multiple domains by a domain divider 592 forming an angle of approximately 45 degrees or approximately −45 degrees with respect to the transmissive axis 1 of the polarizer. The domain divider 592 of the common electrode 90 is formed at both sides of the domain divider 483 of the pixel electrode 82. In an embodiment, cutouts are provided on the pixel electrode 82 or the common electrode 90 in a diagonal direction. In an embodiment, protrusions may be provided on the pixel electrode 82 or the common electrode 90 as a domain divider. The pixel electrode 82 may be divided into multiple domains by the domain divider 483 of the pixel electrode 82 and the domain divider 592 of the common electrode 90.

Multiple domains divided by the domain dividers 483 and 592 according to the tilt directions of the liquid crystal molecules is described with reference to FIG. 6. The pixel electrode 82 is divided into first and second domain groups in a longitudinal direction with respect to the transverse long axis passing through the center of the pixel electrode 82. In an embodiment, the first domain group includes a plurality of domains A aligned at an angle of approximately 135 degrees and a plurality of domains B aligned at an angle of approximately −45 degrees with respect to gate lines 22. The second domain group includes a plurality of domains C aligned at an angle of approximately −135 degrees and a plurality of domains D aligned at an angle of approximately 45 degrees with respect to the gate lines 22. As shown in FIG. 6, the first domain group can be arranged such that each of the plurality of domains A and each of the plurality of domains B are alternately arranged. The domains selected alternately from the domains A and B, for example, in a B-A-B-A order, may be arranged. The second domain group can be arranged such that each of the plurality of domains C and each of the plurality of domains D are alternately arranged. The domains selected alternately from the domains C and D, for example, in a D-C-D-C order, may be arranged.

An LCD according to an embodiment can achieve a wide viewing angle by driving a pixel divided into multiple domains and increasing a high aperture ratio by reducing an occupied area using the domain dividers 483 and 592. In addition, an instantaneous residual image can be suppressed by adjusting a distance between the domain divider 483 formed on the pixel electrode 82 and the domain divider 592 formed on the common electrode 90.

Since the transverse length of the pixel electrode 82 is longer than the longitudinal length thereof, occurrence of textures due to the lateral electric field produced from data lines 62 can be suppressed by reducing an area of the pixel electrode 82 adjacent to the data lines 62.

When a passivation layer 70 having a double-layered structure comprising an inorganic material and an organic material is used and the passivation layer 70 has a relatively large thickness, a lateral electric field effect produced from a storage electrode 29 may not be significant. Therefore, to achieve a sufficient lateral electric field, a width of the domain divider 83 can be reduced to approximately 10 μm or less.

Figure 7:
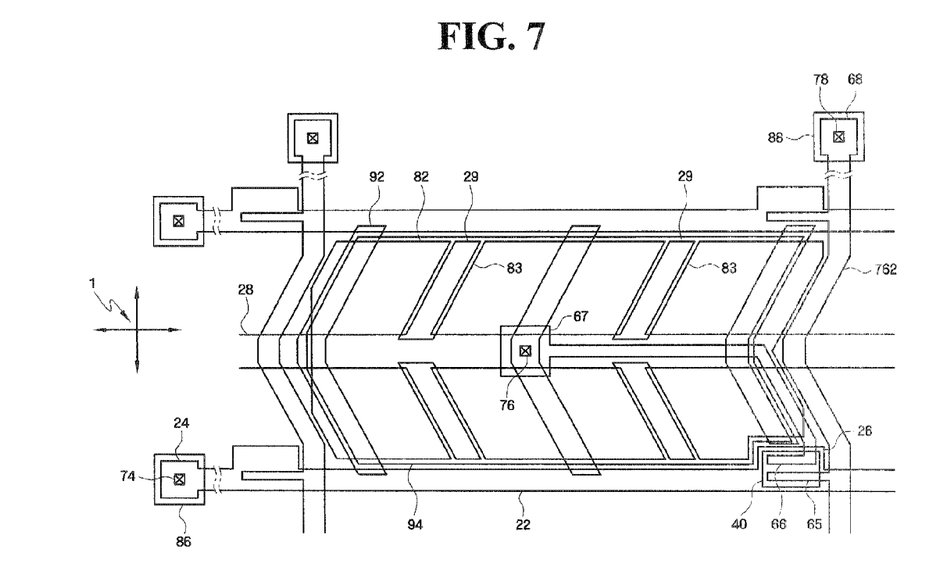
FIG. 7 is a layout view of an LCD according to an embodiment of the present invention.

A liquid crystal display according to an embodiment of the present invention is described with reference to FIG. 7. FIG. 7 is a layout view of an LCD according to an embodiment of the present invention. The liquid crystal display panel in this embodiment has a substantially similar configuration as the liquid crystal display panel according to an embodiment described in connection with FIGS. 1A through 3C except for the following.

Referring to FIG. 7, each of data lines 762 includes bent portions and longitudinal portions. The bent portions of the data line 762 form an angle of approximately 45 degrees or −45 degrees with respect to a transmissive axis 1 of a polarizer. Therefore, occurrence of texture due to abnormal alignment of liquid crystal molecules in the vicinity of data line 762 can be prevented by producing lateral electric fields of the same directions to domain dividers 83 and 92 and the data lines 762.

Figure 8:
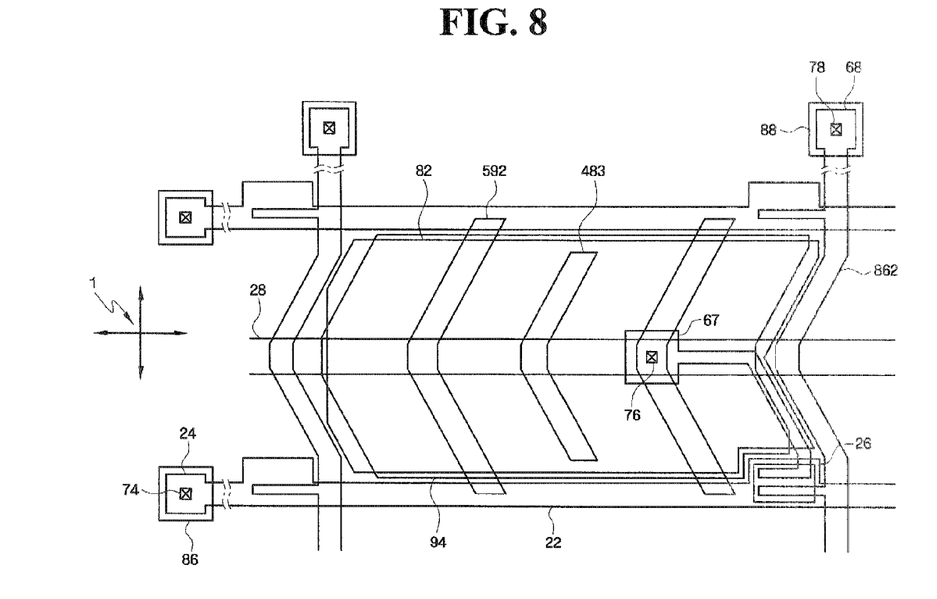
FIG. 8 is a layout view of an LCD according to an embodiment of the present invention.

A liquid crystal display according to an embodiment of the present invention is described with reference to FIG. 8. FIG. 8 is a layout view of an LCD according to an embodiment of the present invention. A liquid crystal display panel in this embodiment has a substantially similar configuration as the liquid crystal display panel in an embodiment described in connection with FIG. 4 through FIG. 6 except for the following.

Referring to FIG. 8, each of data lines 862 includes bent portions and longitudinal portions. The bent portions of the data line 862 form an angle of approximately 45 degrees or approximately −45 degrees with respect to a transmissive axis 1 of a polarizer. Therefore, occurrence of textures due to abnormal alignment of liquid crystal molecules in the vicinity of data line 862 can be prevented by producing lateral electric fields of the same directions to domain dividers 483 and 592 and the data lines 862.

According to an embodiment of the present invention, instantaneous residual images and textures can be prevented and a high aperture ratio and a wide viewing angle can be achieved.

Although the exemplary embodiments of the present invention have been described with reference to the accompanying drawings, it is to be understood that the present invention should not be limited to these precise embodiments but various changes and modifications can be made by one ordinary skill in the art without departing from the spirit and scope of the present invention. All such changes and modifications are intended to be included with the scope of the invention as defined by the appended claims.

What is claimed is:

1. A liquid crystal display comprising:
  a gate line extended to a transverse direction;
  a data line crossing the gate line and extended to a longitudinal direction;

a pixel electrode disposed on an area defined by the gate line and data line;
a thin film transistor (TFT) panel including a first domain divider having upper and lower half portions arranged symmetrically with respect to a transverse long axis passing through a center of the pixel electrode;
a common electrode panel including a common electrode facing the pixel electrode, the common electrode including a second domain divider arranged parallel with the first domain divider; and
a liquid crystal layer interposed between the TFT panel and the common electrode panel,
wherein the pixel electrode includes a transverse length parallel with the gate line and a longitudinal length parallel with the data line, and
wherein the transverse length is longer than the longitudinal length.

2. The liquid crystal display of claim 1, further comprising first and second polarizers attached to external surfaces of the TFT panel and the common electrode panel, respectively.

3. The liquid crystal display of claim 2, wherein the first and second domain dividers form an angle of approximately 45 degrees or approximately −45 degrees with respect to a transmissive axis of each polarizer.

4. The liquid crystal display of claim 3, wherein in the first and second domain dividers, portions forming an angle of approximately 45 degrees and portions forming an angle of approximately −45 degrees with respect to the transmissive axis of the polarizer are separately arranged from one another with respect to the transverse long axis.

5. The liquid crystal display of claim 1, wherein the first and second domain dividers are alternately arranged.

6. The liquid crystal display of claim 1, wherein the second domain divider is positioned in the center of the pixel electrode and the first domain divider is positioned at both sides of the second domain divider.

7. The liquid crystal display of claim 6, further comprising a storage electrode wire provided on the TFT panel to form a storage capacity together with the pixel electrode, wherein the storage electrode wire comprises a storage electrode line extending in the transverse long axis passing through the center of the pixel electrode, and a storage electrode branched from the storage electrode line to overlap the first domain divider.

8. The liquid crystal display of claim 1, wherein the first domain divider is positioned in the center of the pixel electrode and the second domain divider is positioned at both sides of the first domain divider.

9. The liquid crystal display of claim 8, further comprising a storage electrode wire provided on the TFT panel to form a storage capacitor together with the pixel electrode, wherein the storage electrode line extends in the transverse long axis passing through the center of the pixel electrode.

10. The liquid crystal display of claim 1, further comprising a passivation layer provided below the pixel electrode, wherein the passivation layer comprises an inorganic insulator and protects a structure on the TFT panel, and the first domain divider has a width of approximately 6 µm or less.

11. The liquid crystal display of claim 1, further comprising a passivation layer provided below the pixel electrode, wherein the passivation layer protects a structure on the TFT panel and includes a double-layered structure comprising an inorganic layer and an organic layer, and the first domain divider has a width of approximately 10 µm or less.

12. The liquid crystal display of claim 1, wherein the common electrode panel comprises color filters arranged on an area corresponding to the pixel electrode, the color filters including red, green, and blue color filters repeatedly arranged in a longitudinal direction.

13. The liquid crystal display of claim 1, wherein the TFT is connected to the gate line, the data line, and the pixel electrode.

14. The liquid crystal display of claim 1, wherein the data line has bent portions and longitudinal portions, and the TFT is connected to the gate line, the data line, and the pixel electrode.

15. The liquid crystal display of claim 14, further comprising first and second polarizers attached to external surfaces of the TFT panel and the common electrode panel, respectively.

16. The liquid crystal display of claim 15, wherein the bent portions of the data line form an angle of approximately 45 degrees or approximately −45 degrees with respect to a transmissive axis of each polarizer.

17. A liquid crystal display comprising:
an insulating substrate;
a plurality of gate lines formed on the insulating substrate;
a plurality of data lines crossing the plurality of gate lines;
a plurality of pixel electrodes formed on the insulating substrate in a matrix and each pixel electrode having a first side parallel to the plurality of gate lines and a second side shorter than the first side, the second side being adjacent to the first side;
a common electrode facing the plurality of pixel electrodes; and
a liquid crystal layer interposed between the plurality of pixel electrodes and the common electrode panel and having liquid crystal molecules,
wherein the liquid crystal layer includes a first domain group and a second domain group, the first domain group including the liquid crystal molecules aligned at an angle of approximately 135 degrees or approximately −45 degrees with respect to the gate lines and the second domain group including the liquid crystal molecules aligned at an angle of approximately −135 degrees or approximately 45 degrees with respect to the gate lines.

18. The liquid crystal display of claim 17, wherein the first domain group includes a plurality of domains aligned at an angle of approximately 135 degrees and a plurality of domains aligned at an angle of approximately −45 degrees with respect to the gate lines, and the second domain group includes a plurality of domains aligned at an angle or approximately −135 degrees and a plurality of domains aligned at an angle of approximately 45 degrees with respect to the gate lines.

19. The liquid crystal display of claim 17, wherein the pixel electrode includes a first domain divider, wherein each of the plurality of domains includes upper and lower half portions arranged symmetrically with respect to a transverse long axis passing through the center of the pixel electrode, and the common electrode includes a second domain divide parallel to the first domain divider.

20. The liquid crystal display of claim 19, wherein the first domain divider includes a first portion forming an angle of approximately 45 degrees and a second portion forming an angle of approximately −45 degrees with respect to the gate lines.

21. The liquid crystal display of claim 20, wherein the first and second portions are separately arranged from each other with respect to the transverse long axis.

22. The liquid crystal display of claim 19, wherein the first and second domain dividers are alternately arranged.

* * * * *